United States Patent [19]

Kitchen et al.

[11] 4,193,708

[45] Mar. 18, 1980

[54] GIRDER CLAMP

[75] Inventors: Roger M. Kitchen, Sheffield; Frank Lister, Halifax, both of England

[73] Assignee: Deborah Services Limited, Wakefield, England

[21] Appl. No.: 939,223

[22] Filed: Sep. 5, 1978

[30] Foreign Application Priority Data

Sep. 19, 1977 [GB] United Kingdom ............... 38960/77
May 22, 1978 [GB] United Kingdom ............... 38960/78

[51] Int. Cl.² ............................................. F16B 7/08
[52] U.S. Cl. ..................................... 403/188; 403/386
[58] Field of Search ............... 403/384, 385, 386, 389, 403/391, 398, 399, 188, 49

[56] References Cited

U.S. PATENT DOCUMENTS

| 184,957 | 12/1876 | Doeg | 403/399 X |
| 1,636,930 | 7/1927 | Vila | 403/399 |
| 2,245,939 | 6/1941 | Schiller | 403/386 X |

Primary Examiner—Wayne L. Shedd
Attorney, Agent, or Firm—Schwartz & Weinrieb

[57] ABSTRACT

A fitting adapted to be secured to a length of scaffold tube and to clamp said scaffold tube to a girder. The fitting comprises a main body, a clamp pivotally mounted on the main body and means for releasably holding the clamp to the main body. The clamp and main body are so shaped as to receive and clamp between them a length of scaffold tube and the main body is further shaped such that the vertical load of the scaffold tube is borne substantially entirely by the main body. A portion of the main body extends at an end remote from the clamp in a direction substantially at right angles to the major length of the main body and a screw is provided which is engageable with a flange of the girder whereby a length of scaffold tube fitted with the fitting can be clamped to the flanged girder.

10 Claims, 14 Drawing Figures

GIRDER CLAMP

BACKGROUND OF THE INVENTION

This invention relates to the attachment of scaffolding platforms, workmen's platforms or cradles and the like to flanged girders of steel or like material and is particularly concerned with fittings for securing scaffolding to such girders.

It is known to clamp scaffold tubes to one another at right angles by means of clamps which are shaped to engage around the scaffold tubes and which are held in position by means of a single screw. Such arrangements are disclosed for example in British Patent Specifications Nos. 785128 and 65380. However, such arrangements cannot be used to clamp scaffold tubes to flanged girders.

SUMMARY OF THE INVENTION

The object of the present invention is to provide a fitting which can be used to clamp a scaffold tube to a flanged girder, the scaffold tube forming part of a workmen's platform or cradle whereby said platform can be secured directly to the girder.

According to the invention, there is provided a fitting adapted to be secured to a length of scaffold tube and to clamp said scaffold tube to a girder, said fitting comprising a main body, a clamp pivotally mounted on the main body, said clamp and main body being so shaped as to receive and clamp between them a length of scaffold tube, the main body further being so shaped that the vertical load of the scaffold tube is borne substantially entirely by said main body, and a portion of said main body extending at an end remote from the clamp in a direction substantially at right angles to the major length of the main body, a screw being provided which is engageable with a flange on a girder whereby a length of scaffold tube fitted with said fitting can be clamped to a flanged girder.

BRIEF DESCRIPTION OF THE DRAWINGS

The invention will now be further described, by way of example, with reference to the accompanying drawings, in which.

In the drawings, like parts are denoted by like reference numerals.

DESCRIPTION OF PREFERRED EMBODIMENTS

Figure 1:
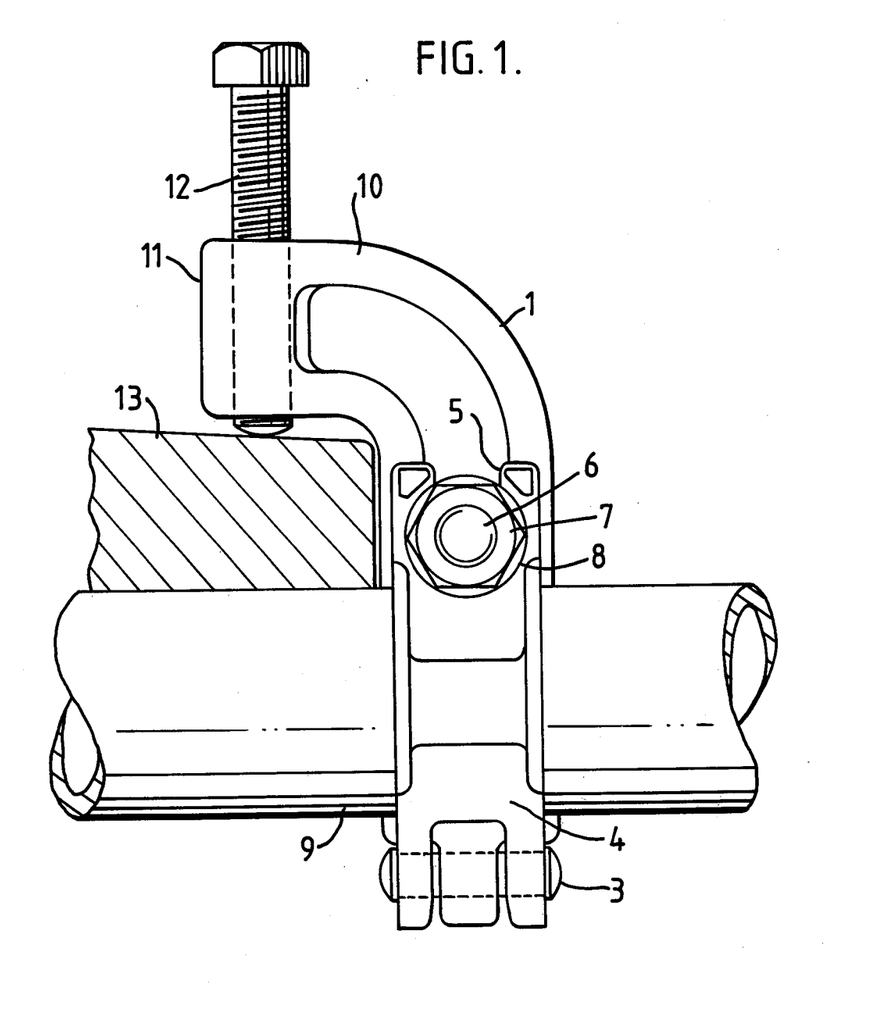
FIG. 1 is a side elevation of one embodiment of a girder fitting according to the invention.
Figure 2:
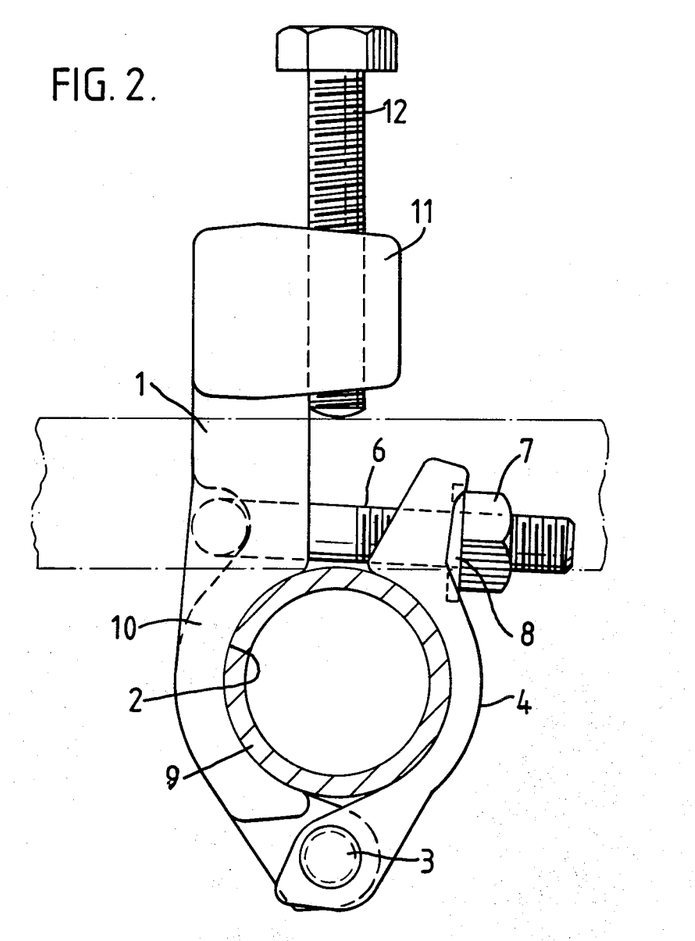
FIG. 2 is a front elevation of the fitting shown in FIG. 1.

Reference will first be made to FIGS. 1 and 2 of the drawings in which the fitting 10 comprises a main body 1 having, adjacent one end, an arcuate recess 2 and on which one end of a latch or clamp 4 is pivotally mounted by means of a rivet 3. A latch bolt 6 is also pivotally mounted on the main body 1 and is receivable in a slot 5 in the other end of the clamp 4. The latch bolt 6 is screw-threaded along at least part of its length and a nut 7 and washer 8 are provided thereon.

The other end of the main body 1 is curved from the axis of the major portion of the length of said body and terminates in a part 11 extending substantially at right angles to said axis. The part 11 is provided with a screw-threaded bore for receiving a screw 12.

In use, the fitting is secured to a length of scaffold tube 9 by engaging the arcuate recess 2 on said scaffold tube 9 and pivoting the clamp 4 into engagement with said scaffold tube. The latch bolt 6 is then allowed to drop into the slot 5 in the clamp 4 and the nut 7 turned until the body 1 and clamp 4 are clamped to the scaffold tube in an immovable manner. The fitting is then ready for the part 11 of the main body 1 to be hooked over the flange 13 of a flanged girder. The screw 12 is then turned to draw the scaffold tube 9 into engagement with the underside of the flange 13.

Owing to the main body 1 being in a vertical plane, the vertical load from the scaffold tube 9 is transferred, via the lug retaining the rivet 3, into the main body 1. By means of this arrangement, the latch bolt is only subjected to loads from the fitting being clamped onto the scaffold tube 9.

Figure 3:
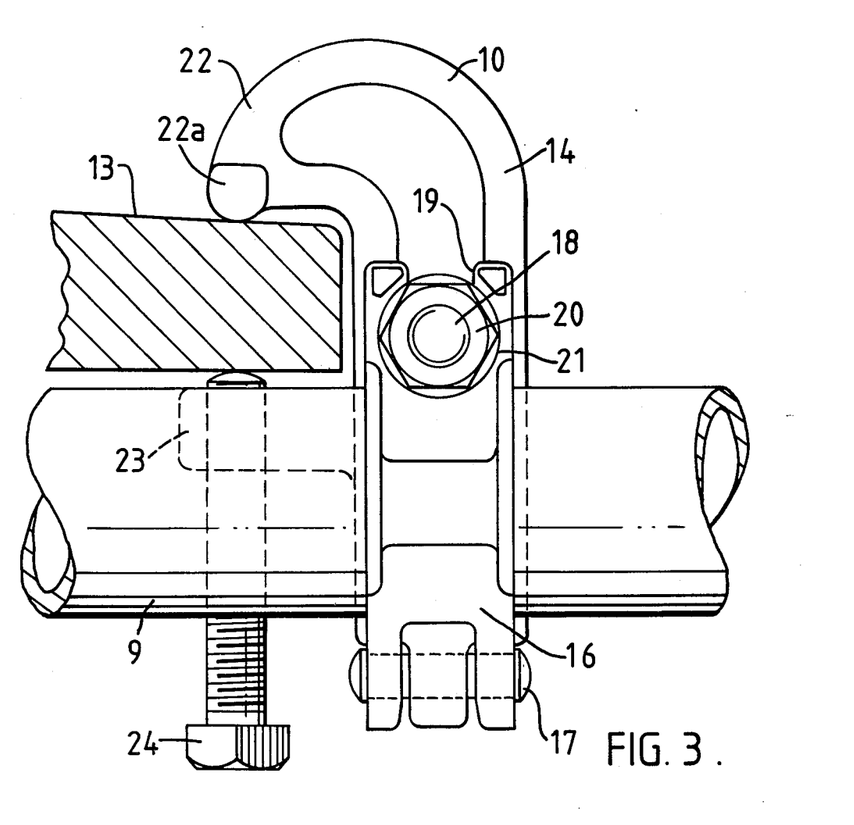
FIG. 3 is a side elevation of a second embodiment of a girder fitting according to the invention.
Figure 4:
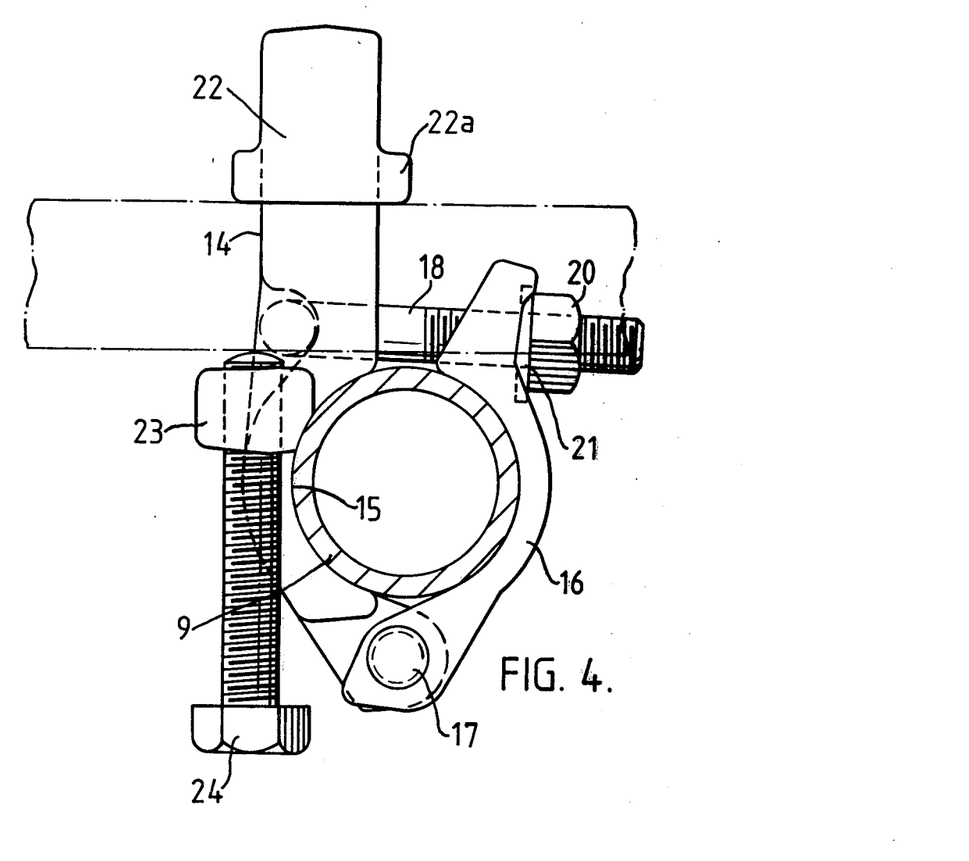
FIG. 4 is a front elevation of the fitting shown in FIG. 3.

Referring now to FIGS. 3 and 4 of the drawings, the fitting 10 comprises a main body 14 having adjacent one end an arcuate recess 15 and on which one end of a latch or clamp 16 is pivotally mounted by means of a rivet 17. A latch bolt 18 pivotally mounted on the main body 14 is receivable in a slot 19 in the other end of the clamp 16. Part of the length of the latch bolt 18 is screw-threaded for receiving a nut 20, a washer 21 being interposed between the nut 21 and clamp 16.

The other end of the main body 14 is curved from the axis of the major portion of the length of said body and terminates in a part 22 extending substantially at right angles to said axis. The end of said part 22 is provided with a bar-like projection 22a the longitudinal axis of which is substantially perpendicular to said axis of the main body as well as to the remainder of part 22. The projection 22a is intended to rest on the flange 13 of a flanged girder.

Located intermediate the ends of the main body 14 and extending substantially at right angles to the said axis of the main body is a lug 23 which is aligned with the part 22 but spaced therefrom. The lug 23 is provided with a screw-threaded bore for receiving a screw 24.

As with the embodiment described with reference to FIGS. 1 and 2 of the drawings, the fitting shown in FIGS. 3 and 4 can be secured to a length of scaffold tube 9 by engaging the arcuate recess 15 on the scaffold tube and pivoting the clamp 16 into engagement with the said scaffold tube. The latch bolt 18 is then allowed to drop into the slot 19 in the clamp 16 and the nut 20 turned until the main body 14 and clamp 16 are clamped to the scaffold tube in an immovable manner. The part 22 can then be hooked over the flange 13 of a flanged girder so that the projection 22a bears on said flange and the screw 24 turned to clamp the fitting to the flange 13.

Again, in this case, the vertical load from the scaffold tube 9 is transferred to the main body 14 via the lug retaining the rivet 17 so that the latch bolt is subjected only to the load of the fitting being clamped onto the scaffold tube. Moreover, in this embodiment, the load of the scaffold tube and fitting is borne by the part 22 and its projection 22a, the screw 24 serving merely to secure the fitting onto the girder and not being subjected to direct load.

The main body 1 or 14 and latch or clamp 4 or 16 are preferably made of drop forged steel while the bolt 6 or 18 and screw 12 or 24 are preferably made of mild steel although other materials may be used if desired.

Either of the above described fittings according to the invention can be used in a variety of applications, examples of which are shown in FIGS. 5 to 14 of the accompanying drawings.

Figure 5:
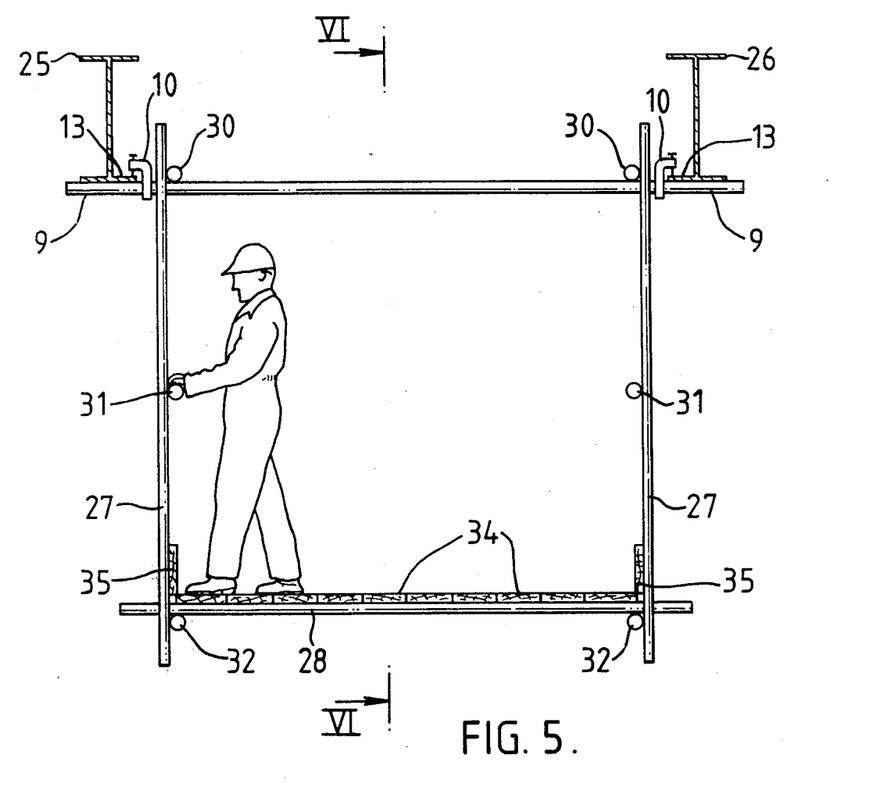
FIG. 5 shows one manner in which fittings according to the invention may be used in the construction of a working platform.
Figure 6:
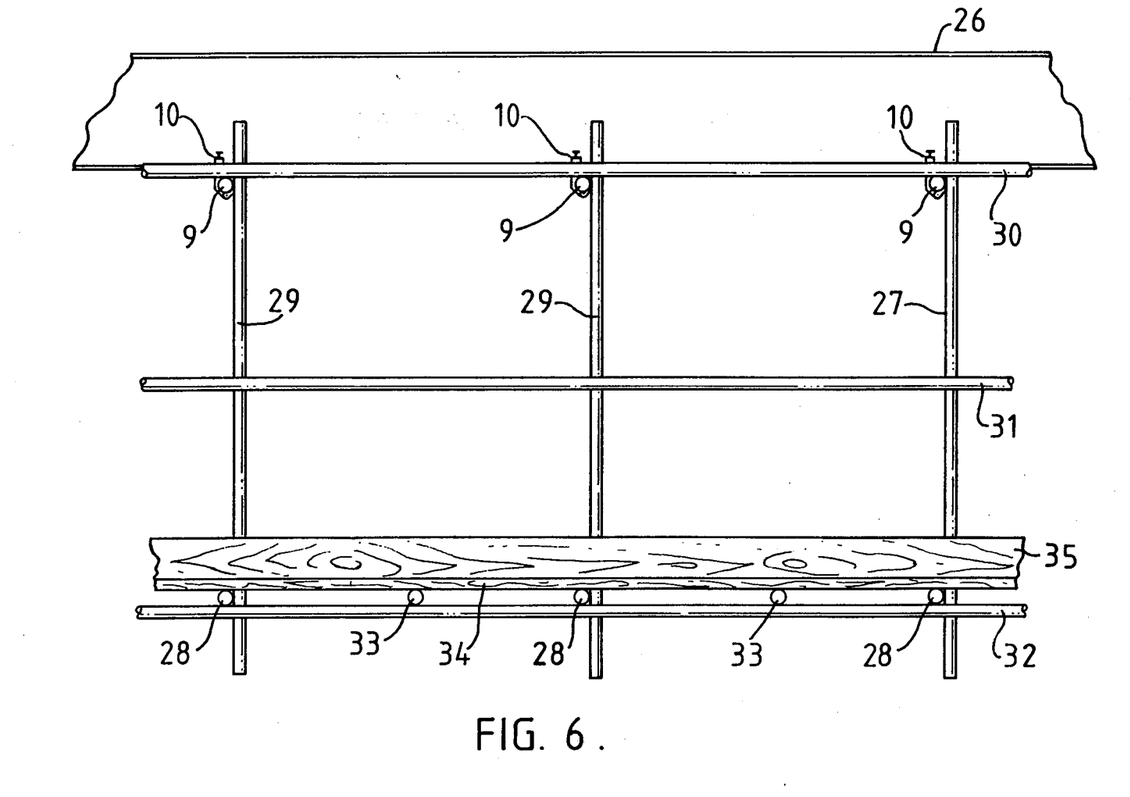
FIG. 6 is a section taken on line VI—VI in FIG. 5.

FIGS. 5 and 6 show the manner in which fittings according to the invention can be used to suspend a working platform from a series of flanged girders forming the steelwork of, for example, a bridge or roof in order to gain access for painting or maintenance work for example. As shown in FIG. 5, a single scaffold tube 9 is secured to the flange 13 of two parallel girders 25 and 26 by means of two fittings 10.

A series of vertical scaffold tubes 27 are secured at spaced intervals to the scaffold tube 9 and a horizontal scaffold tube 28 is secured to the scaffold tubes 27 to extend parallel to the scaffold tube 9 to form a framework. This framework is secured to a like framework 29 (FIG. 6) by further horizontal scaffold tubes 30, 31 and 32, the tubes 32 being interconnected between the two frameworks by a transversely extending scaffold tube 33. Timber boards 34 are laid on the scaffold tubes 28 and 33 to form a working platform. Additional vertical boards 35 serve as toe boards and the scaffold tubes 31 serve as hand rails. The platform may be extended further by other frameworks 29 as shown in FIG. 6.

Figure 7:
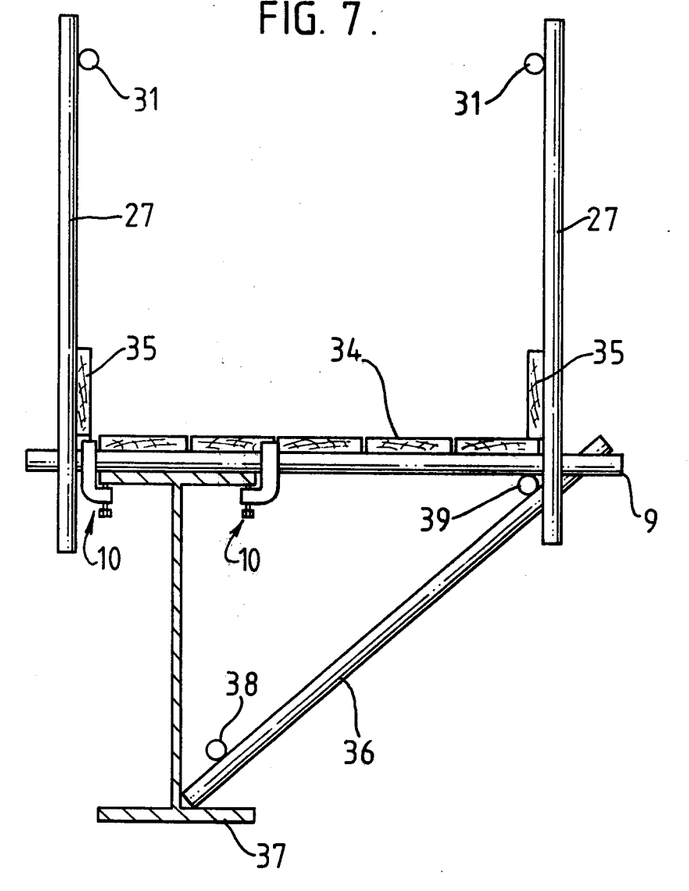
FIG. 7 shows fittings according to the invention used in the construction of one embodiment of a cantilevered scaffold platform.

FIG. 7 shows an example of a cantilevered scaffold which can be used where areas to be painted or maintained are near steelwork to which a working platform can be fixed by means of fittings 10 according to the invention. In this case, the boards 34 are placed directly on a series of scaffold tubes 9 to which vertical tubes 27 are secured for the location of toe boards 35 and hand rails 31. Furthermore, the platform can be braced by means of struts 36 bearing on the lower flange of an I-section girder 37 to the upper flange of which the fittings 10 are secured. Adjacent struts 36 are connected together by scaffold tubes 38 and adjacent scaffold tubes 9 are connected together by scaffold tubes 39.

Figure 8:
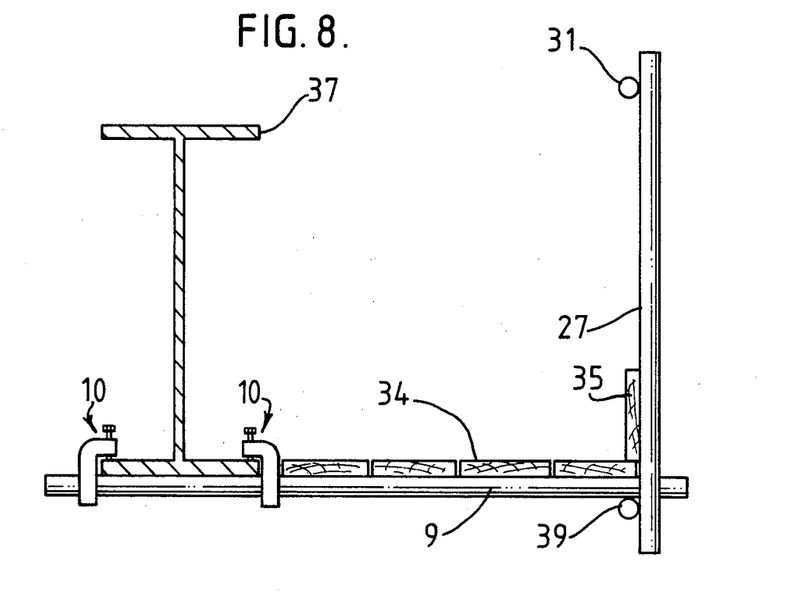
FIG. 8 is a view, similar to FIG. 7, of a second embodiment of a cantilevered scaffold platform having fittings according to the invention.

In the alternative embodiment shown in FIG. 8, the fittings 10 are secured to the lower flange of I-section girder 37. In this case, the struts 36, scaffold tubes 38, one set of the vertical scaffold tubes 27 and one hand rail 31 can be disposed with.

Figure 9:
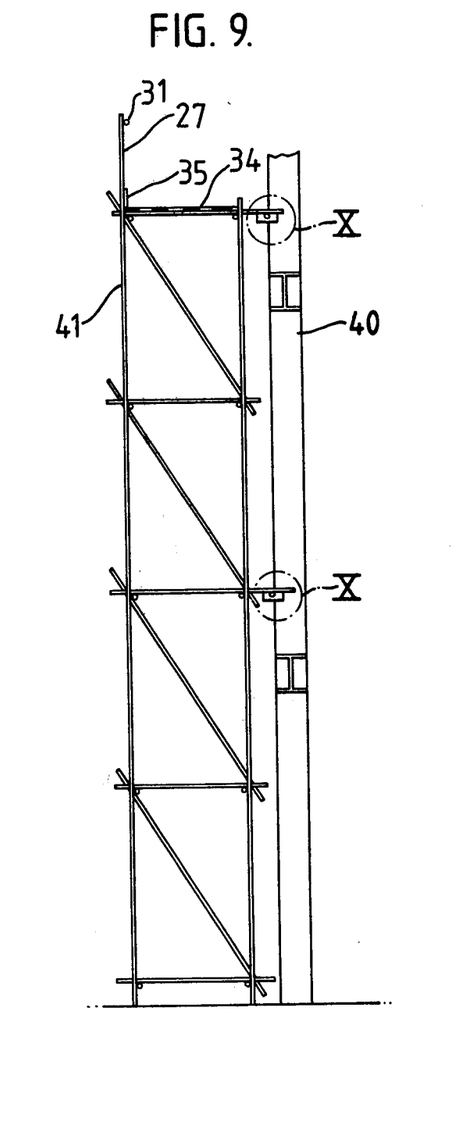
FIG. 9 shows fittings according to the invention used in tieing scaffolding to vertical steelwork columns.
Figure 10:
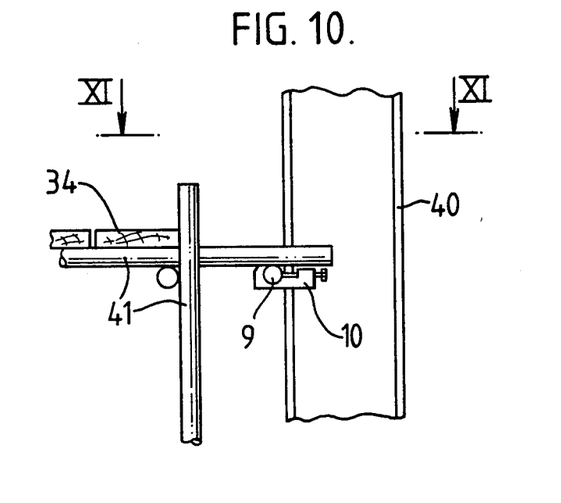
FIG. 10 shows the detail marked X in FIG. 9 to an enlarged scale.
Figure 11:
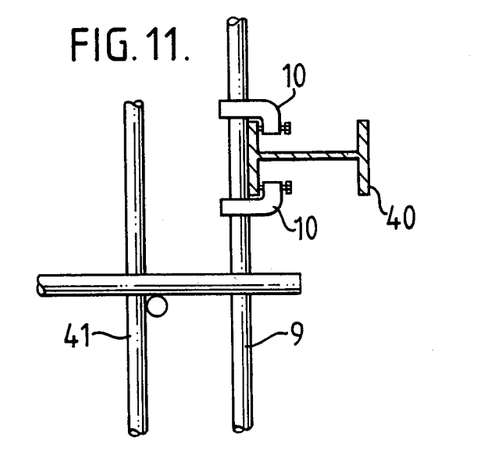
FIG. 11 is a section taken on the line XI—XI in FIG. 10.

FIGS. 9 to 11 show how fittings according to the invention can be used for securing scaffolding to steelwork. Two fittings 10 are clamped to a vertical I-section girder 40 as shown in FIGS. 10 and 11 and scaffolding 41 is secured to the scaffold tubes 9 which are clamped to the girder by the fittings 10.

Figure 12:
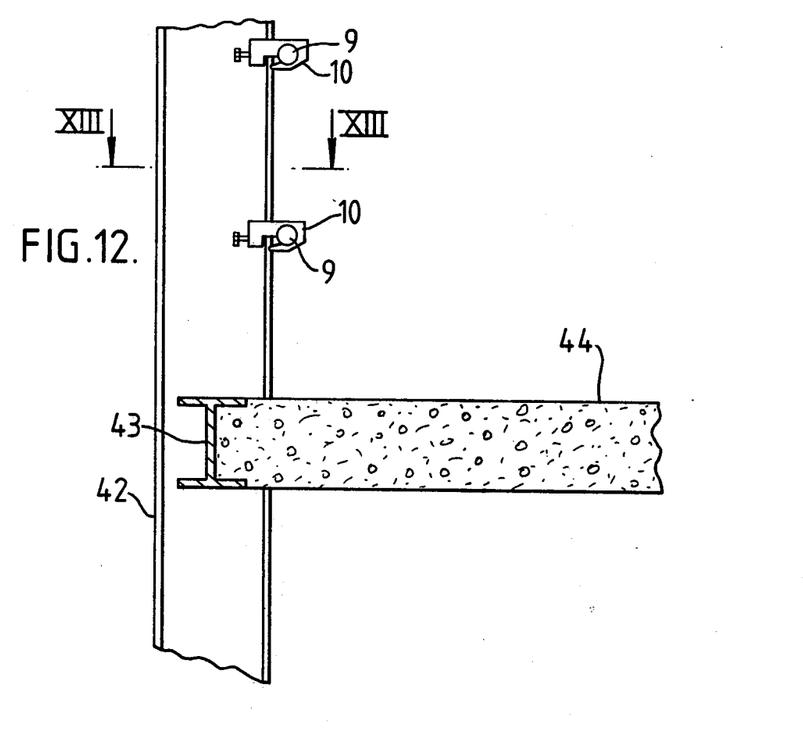
FIG. 12 shows fittings according to the invention used for securing hand rails to vertical steelwork columns in an unfinished building.
Figure 13:
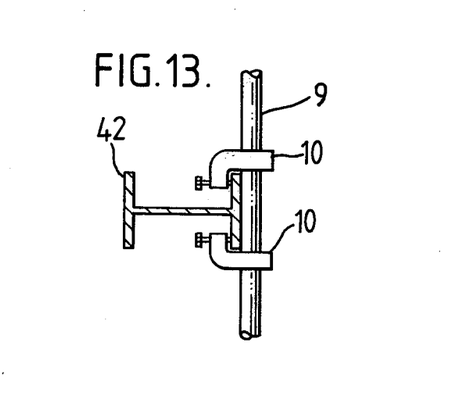
FIG. 13 is a section taken on the line XIII—XIII in FIG. 12.

FIGS. 12 and 13 show how fittings according to the invention can be used to secure scaffold tubes 9 serving as hand rails to columns consisting of vertical I-section girders 42 to which are secured horizontal girders 43 which carry a floor level 44 of an unfinished building. The hand rails can be readily fitted and provide safer working conditions for workmen on the floor level 44.

Figure 14:
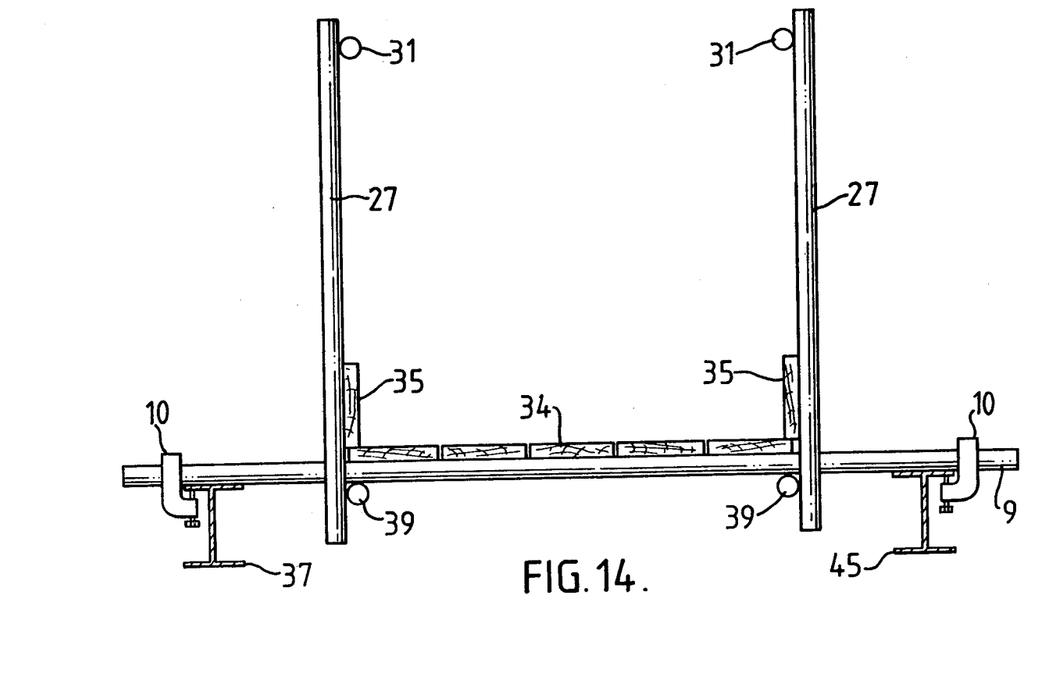
FIG. 14 shows fittings according to the invention used in the construction of yet another form of working platform.

FIG. 14 shows an arrangement for erecting a platform scaffold which is similar to the arrangement shown in FIG. 7 except that in this case the scaffold tube 9 is secured to the upper flanges of two I-section girders 37 and 45 extending parallel to each other. In this case, only one fitting 10 is required to secure the scaffold tube 9 to each girder and to prevent movement of the scaffold tube 9 along the girders 37 and 45.

It will be seen that, by means of the fitting according to the invention, standard equipment used throughout the scaffolding industry may be used to secure a variety of working platforms to girder form steelwork thus representing a considerable saving in special equipment which would otherwise be necessary.

Other embodiments and modifications of the above described fittings are possible without departing from the scope of this invention as defined by the appended claims.

We claim:

1. A fitting adapted to be secured to a length of scaffold tube for clamping said scaffolding tube to the horizontal flange of a flanged girder, said fitting comprising:
   a main body, the major length of which extends in the vertical direction,
   a clamp pivotally mounted on said main body,
   said clamp and main body being so configured as to cooperatively receive and clamp therebetween said length of scaffold tube,
   substantially horizontally disposed first fastening means for releasably securing said clamp to said main body,
   a portion of said main body extending, at a position remote from the pivotal connection of said clamp, in a direction substantially perpendicular to the major length of said main body,
   said main body and clamp being secured to said scaffold tube at a position adjacent an edge portion of said girder flange such that said portion of said main body overlies the upper surface of said horizontal flange of said flanged girder, and
   second fastening means operatively cooperable with said main body for engaging said horizontal flange of said girder,
   whereby, as said second fastening means is tightened with respect to said main body, said length of scaffold tube and said flanged girder are moved relative to each other so as to be tightly clamped together.

2. A fitting as claimed in claim 1, in which the main body is provided with an arcuate recess adapted to receive and engage a portion of the scaffold tube, the clamp being pivotally mounted on the main body adjacent said arcuate recess.

3. A fitting as claimed in claim 1, in which the clamp is pivotally mounted at one end on the main body, the other end of the clamp is provided with a slot and the releasable fastening means comprise a bolt pivotally mounted on the main body and engageable in the slot in said clamp.

4. A fitting as claimed in claim 3, in which the head of the bolt is pivotally mounted in the main body and said bolt has a screw-threaded shank, a nut being engaged on said screw-thread and being effective, on being turned, to draw the said other end of the clamp towards the main body.

5. A fitting as claimed in claim 1, in which said portion of the main body extending substantially perpendicular to the major length of said main body is provided with a screw-threaded bore and in which said second fastening means is engageable with the screw-thread of said bore.

6. A fitting as claimed in claim 1, in which the main body is provided, intermediate its ends, with a lug aligned with said portion of the main body extending substantially perpendicular to the major length of said main body but spaced from said portion.

7. A fitting as claimed in claim 6, in which the lug is provided with a screw-threaded bore and said second fastening means is engageable with the screw-thread of said bore.

8. A fitting as claimed in claim 1, in which the main body and clamp are made of drop forged steel.

9. A fitting as set forth in claim 1, wherein:
said direction along which said main body portion extends is defined as being substantially perpendicular to the plane defined by the directions of the major length of said main body and said first fastening means.

10. A fitting as set forth in claim 6, wherein:
said portion of said main body rests upon said upper surface of said horizontal flange of said flanged girder;
said lug of said main body is disposed beneath the lower surface of said horizontal flange of said flanged girder; and
said second fastening means operatively cooperates with said lug of said main body and operatively engages said lower surface of said girder flange.

* * * * *